United States Patent Office 3,242,428
Patented Mar. 22, 1966

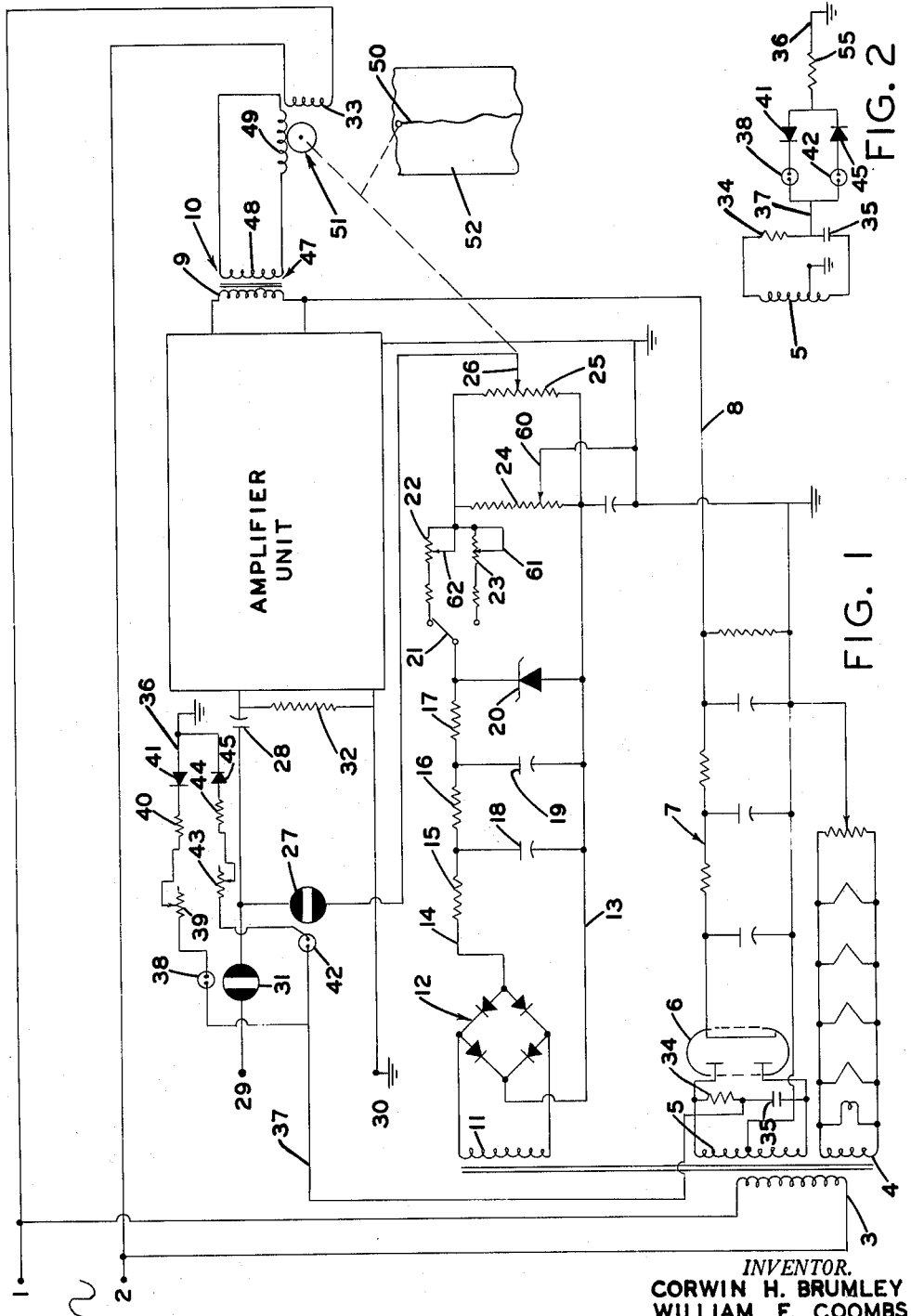

3,242,428
AUTOMATIC REBALANCING MEASURING CIRCUIT INCLUDING A PHASE SHIFTED PHOTOMODULATOR
Corwin H. Brumley, Penfield, and William F. Coombs, Irondequoit, N.Y., assignors to Bausch & Lomb Incorporated, Rochester, N.Y., a corporation of New York
Filed Aug. 21, 1961, Ser. No. 132,871
2 Claims. (Cl. 324—99)

This invention relates to a potentiometer and, more specifically, to a photomodulating circuit, providing a high impedence at all times to the input for the potentiometer.

Many of the conventional chart recording potentiometers presently in use employ an electromechanical chopper to convert D.C. to A.C. The mechanical choppers are usually expensive and have a relatively short life expectancy. Accordingly this invention replaces the electromechanical chopper with an electrical chopper. Another desirable feature of this potentiometer is that it has a minimum of electrical drain from the signal being tested. Many of the instruments presently in use require considerable power from the signal device and consequently do not provide a satisfactory testing means. Accordingly, this instrument is devised to provide a high impedence input with a negligible drain on the device under test.

It is an object of this invention to provide a high impedence input at all times in a potentiometer.

It is another object of this invention to employ a photomodulating circuit and an amplifying unit in a self balancing potentiometer.

The objects of this invention are accomplished by constructing a voltage measuring instrument with self balancing potentiometer and a chart recorder. A high voltage direct current is supplied through a conventional rectifier system. A reference direct current voltage is also supplied through a bridge rectifier system, a zener diode, and voltage divider system.

The device is operated from an alternating current line, which energizes the main field of the motor. The main field of the motor is in phase with the line current. A photomodulating circuit is connected across the transformer secondary winding supplying the B+ and is coupled with a conventional amplifier. The photomodulating circuit modulates with the alternating line current. The alternating line current at the phase of the input to the photomodulating circuit is shifted due to the capacitive and restrictive connection across secondary winding. A pair of neon tubes and a pair of rectifiers are placed in the circuit across the junction of the resistive and capacitive elements connected to the secondary winding, and ground. The photomodulating circuit alternately impresses a voltage impulse from the test voltage, and from a reference voltage on the amplifier input. In this manner the photomodulating circuit provides the amplifier with a pulsating input at the line frequency. The secondary field of the motor is energized by the amplifier output. The motor operates in the direction depending upon the relative amplitude of the test voltage and reference voltage. In this manner the motor operates when an unbalance exists between these two amplitudes which is fed into the secondary field windings. The motor moves the potentiometer sliding arm, which supplies the reference voltage, to a null position. The position of the arm is recorded by the recording mechanism on the device.

The foregoing and other objects of the invention will become apparent in the following detailed description of the representative embodiments disclosed in the drawings wherein;

FIG. 1 is a circuit illustrating the electrical components of the potentiometer.

FIG. 2 is a modification of the modulating circuit including the neon bulbs and the diodes.

Referring to FIG. 1, a conventional alternating current line is connected to the terminals 1 and 2. A primary transformer winding 3, is connected across the terminals 1 and 2. A secondary filament winding 4 supplies the energization for the filaments for the various tubes in the potentiometer. A center tap winding 5 is connected to a twin rectifier 6 to provide a positive direct current voltage for the tubes in the device. A conventional filtering circuit 7 is connected to the cathode of the twin rectifier 6. Primary winding 9 of transformer 10 is connected to the plate of the output tube in the amplifier unit. The conductor 8 also supplies the plate voltage to the other of the plurality of amplifier tubes in the amplifier unit.

A reference voltage is developed across the potentiometer resistor 25 by the secondary winding 11, which is connected to the bridge rectifier 12. The conductor 13 is at a positive potential, relative to the conductor 14. A filtering network is formed by the plurality of resistors 15, 16, 17 and the capacitors 18 and 19. A zener diode 20 is connected across the filtered reference voltage to maintain a more constant voltage. The switch 21 and the resistance network 22 and 23 are an added control for varying the potential of the reference voltage. The reference voltage ground connection is through the variable resistor 24 and arm 60. The contact arm 26, is connected through the photo conductive cell 27 to the amplifier grid circuit.

The voltage to be tested is impressed on the terminals 29 and 30. The terminal 29 is connected to the grid coupling capacitor 28 through the photo conductive cell 31. The grid resistor 32 and the grid capacitor 28 are in the grid control circuit for the first amplifier tube of the amplifier unit.

The line voltage connected to terminals 1 and 2 is impressed across the main field winding 33 which is in phase with the line current. A resistor 34 and capacitor 35 are connected across the secondary winding 5. The neon lamp circuit is connected across the secondary winding 5 by resistor 34 and capacitor 35 and ground to provide a phase shift with respect to the line current.

A light source, such as a neon lamp 38, is connected to a variable resistor 39 and a fixed resistor 40. These elements are connected in series with a diode 41. A parallel and similar circuit includes the neon lamp 42, the variable resistor 43 and fixed resistor 44 and the diode 45. It can be seen that each of these two neon lamps conduct only during half the cycle of the alternating current from the line. The direction of the conduction depends on the positioning of the diode 41 and 45. With the negative voltage impressed on conductor 37 the diode 41 is conducting permitting the neon lamp 38 to be illuminated. When the voltage on the conductor 36 is negative relative to conductor 37 the diode 45 is conducting thereby illuminating the neon lamp 42. The neon lamp 38 is positioned to radiate a luminous flux on the photoconductive cell 31. As the photoconductive cell 31 is conducting, low resistance to flow of current is present in the cell. The test voltage at terminal 29 is applied through the capacitor 28 and across the resistor 32. The photoconductive cell 27, however, presents a high resistance to flow of current as the neon lamp 42 at this phase of the cycle is not illuminated.

With a phase change of 180 degrees, the neon lamp 38 is no longer illuminated. When the lamp 38 is not illuminated, the photoconductive cell 31 presents high resistance to flow of current. The neon lamp 42 is illuminated and the photoconductive cell 27 is conducting permitting application of the reference voltage. During this phase of the voltage cycle the potentiometer or reference voltage is applied to the grid control circuit of capacitor 28 and resistor 32.

The photomodulating circuit in this manner provides a pulsating direct current signal at the input of the amplifier unit. The amplitude of each of the pulses alternately depends upon the tested voltage and the potentiometer or reference voltage impressed across the grid resistor 32 through capacitor 28 on the input of the amplifier unit. The output of the amplifier unit creates a pulsating direct current voltage to the winding 9 of transformer 10.

The voltage in the secondary field winding 49 is out of phase 90 degrees with the main winding 33. This creates a torque in the motor 51. However, if the direct current pulses which are spaced 180 degrees are equal in amplitude no torque is created. This is the null position for the potentiometer arm 26 and recording stylus 50.

If the input reference voltage is greater than the input test voltage, a greater amplitude of the output reference voltage pulse is established, thereby creating a torque on the motor 51. The torque is a self balancing torque which moves the potentiometer arm 26 to a null position. When a null position is reached the pulse voltage generated from the potentiometer and the tested device are equal and a neutral position is reached by the motor. The motor also drives an arm carrying the stylus 50 for inscribing a record on the chart 52. The potentiometer in this manner provides a self-balancing means for recording of the voltage.

FIG. 2 illustrates a modification of the photomodulating network wherein a single resistor 55, is in series with the parallel connected diodes 41 and 45. The conductors 37 and 36 are connected in the manner as in the original disclosed version. This modification provides the same type of output as the original version, but is simplified in that it uses a single resistor 55, replacing the two variable and two fixed resistors in the original version.

The resistor 34 and capacitor 35 shift the voltage phase to lead the line voltage by 90 degrees. This phase which leads the line voltage controls the pulsating direct current to the amplifier control grid. The amplified voltage is 90 degrees out of phase with the line voltage. The reason for amplifying the voltage out of phase with the line voltage is that stray voltages as a rule are in phase with the line voltage. Such voltages may be created by filament voltages wiring connected to the line and so on. By amplifying a voltage out of phase with the line voltage the stray voltages create no torque in motor 51, thus preventing chattering, drift of the motor and false recording by the potentiometer.

The potentiometer has adjustment through the arm 60 for initial adjustment of the potentiometer. The arms 61 and 62 also provide a voltage variation on the potentiometer resistor 25.

The input impedance of the potentiometer recorder is extremely high. This provides a potentiometer which may be used on any type of a voltage device as very little drain is present during testing of a voltage signal. The circuit being electrical in its operation has no moving parts which extends the life of the chopping means. The self-balance feature provides a means for recording of the voltage. The instrument has good sensitivity and yet has very little power drain from the tested signal.

It is understood that the above described arrangement is illustrative and descriptive in setting forth the invention covered herein. Other modifications illustrating and describing this invention may be devised without departing from the spirit of the invention. The following attached claims are considered to cover the invention as described above.

What is claimed is:
1. The combination comprising:
a pair of terminals adapted to be connected to a source of alternating current;
phase shifting means connected to said pair of terminals for producing a modulation signal that is in substantially quadrature phase relation with said source of alternating current;
an input terminal for applying input signals;
a source of reference signals coupled to a reference terminal, said source of reference signals including adjustable means for varying the amplitude of reference signals applied to said reference terminal;
an amplifier circuit;
a photomodulating circuit connected to said input terminal and said reference terminal for modulating said input signals and said reference signals applied thereto and developing modulated signals at an output terminal;
circuit means connecting said photomodulation circuit to said phase shifting means for applying said modulation signal thereto so that said input and reference signals are modulated to provide modulated signals at said output terminal in one of a leading and a lagging quadrature phase relation with said source of alternating current, the amplitude of said modulated signals and said one of said leading and lagging quadrature phase relation being a function of the amplitudes of said input signals and said reference signals;
circuit means connecting said output terminal to said amplifier circuit for amplifying said modulated signals;
a motor having first and second windings, said motor being adapted to generate a rotational torque in response to signals applied in substantially quadrature relation to said first and second windings, the rotational torque being in a direction determined by the leading and lagging phase relation of said signals applied to said first and second windings;
circuit means coupling said first winding to said pair of terminals for energizing said first winding by said source of alternating current;
circuit means coupling said amplifier circuit to said second winding for applying amplified modulated signals thereto, and
means for coupling said motor to said adjustable means to vary the amplitude of reference signals applied to said reference terminal so that said motor supplies the necessary torque to said adjustable means to reduce the modulated signals developed at said photomodulator output terminal.

2. A photomodulated servo system comprising:
first and second photoconductive devices;
an input terminal for applying input signals; a reference terminal for applying reference signals;
circuit means connecting said first photoconductive device between said input terminal and a common terminal;
circuit means connecting said second photoconductive device between said reference terminal and said common terminal;
a first light source positioned with respect to said first photoconductive device so that said first photoconductive device is responsive to said first light source;
a second light source positioned with respect to said second photoconductive device so that said second photoconductive device is responsive to said second light source;
a first unidirectional conductor connected in a series circuit with said first light source;
a second unidirectional conductor connected in a series circuit with said second light source;
a source of alternating current;
phase shifting means connected to said source of alternating current for developing modulation signals that are in substantially quadrature relation with said source of alternating current;
circuit means for connecting said phase shifting means to said series circuits including said first unidirectional conductor and said first light source, and said second unidirectional conductor and said second light source, for applying said modulation signals thereto thereby alternately energizing said first and second light sources in substantially quadrature phase relation with said source of alternating current whereby a modulated signal is developed at said common terminal having an amplitude and one of a leading and a lagging quadrature phase relation with said source of alternating current depending upon the relative amplitudes of the input and reference signals applied to said input and reference terminals respectively;
an amplifier circuit including an input circuit connected to said common terminal;
a two phase motor including a first and second field winding adapted to be energized by signals in substantially quadrature phase relation for developing a rotational torque at the motor shaft;
circuit means coupling said source of alternating current to said first field winding for energization thereof;
circuit means coupling said amplifier circuit to said second field winding for applying amplified modulated signals thereto;
a potentiometer including a movable contact arm coupled to said reference terminal;
a source of reference signals coupled to said potentiometer to develop a reference signal across said potentiometer, and
means for coupling said motor shaft to said movable contact arm so that said motor provides the necessary torque to drive said movable contact arm in a direction to reduce the modulated signals developed at said common terminal.

References Cited by the Examiner

UNITED STATES PATENTS

| | | | |
|---|---|---|---|
| 2,632,886 | 3/1953 | Barney | 324—99 |
| 2,815,487 | 12/1957 | Kaufman | 332—3 |
| 2,889,517 | 6/1959 | Ehret | 324—99 |
| 2,905,823 | 9/1959 | Sparks | 324—99 |
| 3,014,135 | 12/1961 | Hewlett | 332—3 |

WALTER L. CARLSON, *Primary Examiner.*

FREDERICK M. STRADER, *Examiner.*

R. V. ROLINEC, *Assistant Examiner.*